(12) United States Patent
Kirschner et al.

(10) Patent No.: US 12,614,004 B2
(45) Date of Patent: Apr. 28, 2026

(54) DETECTION OF SECURITY ATTACKS THROUGH DIE-ATTACH PAD

(71) Applicant: NUVOTON TECHNOLOGY CORPORATION, Hsin-chu (TW)

(72) Inventors: Yuval Kirschner, Even Yehuda (IL); Tamir Golan, Kibbutz Givaat-Chaim Meuchad (IL)

(73) Assignee: Nuvoton Technology Corp., Hsinchu (TW)

( * ) Notice: Subject to any disclaimer, the term of this patent is extended or adjusted under 35 U.S.C. 154(b) by 88 days.

(21) Appl. No.: 18/438,481

(22) Filed: Feb. 11, 2024

(65) Prior Publication Data

US 2025/0258965 A1     Aug. 14, 2025

(51) Int. Cl.
*G06F 21/87* (2013.01)
*G01R 31/28* (2006.01)
*G06F 21/55* (2013.01)

(52) U.S. Cl.
CPC ......... *G06F 21/87* (2013.01); *G01R 31/2853* (2013.01); *G06F 21/554* (2013.01)

(58) Field of Classification Search
CPC ...................................................... G06F 21/87
See application file for complete search history.

(56) References Cited

U.S. PATENT DOCUMENTS 8,816,717 B2    8/2014  Fritz et al.
9,514,308 B2    12/2016 Filippi et al.

| | | | |
|---|---|---|---|
| 9,965,652 B2 * | 5/2018 | Joharapurkar | .......... G06F 21/75 |
| 10,347,595 B2 * | 7/2019 | Champeix | ............. H01L 23/576 |
| 10,579,833 B1 * | 3/2020 | Cook | ....................... G06F 21/86 |
| 11,074,370 B2 * | 7/2021 | Sugahara | .............. G06F 21/755 |
| 11,502,047 B2 | 11/2022 | Best et al. | |
| 11,636,907 B2 * | 4/2023 | Hershman | ........ G11C 29/12005 |
| | | | 365/201 |
| 2010/0026313 A1 | 2/2010 | Bartley et al. | |
| 2011/0227603 A1 * | 9/2011 | Leon | ....................... H01L 24/24 |
| | | | 361/87 |
| 2013/0206843 A1 * | 8/2013 | McCarthy | ........... H01L 25/0657 |
| | | | 326/8 |
| 2014/0035136 A1 | 2/2014 | Buer et al. | |
| 2015/0108606 A1 * | 4/2015 | Lamy | .................... H01L 23/573 |
| | | | 257/532 |
| 2017/0004686 A1 * | 1/2017 | Zacchio | ................. G08B 13/06 |
| 2019/0051643 A1 * | 2/2019 | Fronte | .................... H10D 89/60 |

(Continued)

OTHER PUBLICATIONS

Cadence, "A Method to Measure Die Pad Capacitance," p. 1, Oct. 24, 2018, as downloaded from https://semiengineering.com/a-method-to-measure-die-pad-capacitance/.

(Continued)

*Primary Examiner* — Viral S Lakhia
(74) *Attorney, Agent, or Firm* — Meitar Patents LTD.; Daniel Kligler

(57) ABSTRACT

An electronic device includes an Integrated Circuit (IC) and a package including a die-attach pad for connecting the IC. The IC includes (i) a measurement circuit configured to measure an electrical characteristic of the die-attach pad, and (ii) a security control circuit configured to initiate a responsive action responsively to detecting a deviation of the measured electrical characteristic of the die-attach pad from an initial measurement of the electrical characteristic.

9 Claims, 3 Drawing Sheets

(56)     References Cited

U.S. PATENT DOCUMENTS

| | | | |
|---|---|---|---|
| 2019/0278945 A1* | 9/2019 | Sugahara | G06F 21/755 |
| 2020/0117836 A1* | 4/2020 | Garbe | G06F 21/79 |
| 2020/0249264 A1* | 8/2020 | Briano | G01R 31/40 |
| 2023/0137364 A1* | 5/2023 | Best | H04L 9/3278 |
| | | | 257/679 |
| 2023/0222251 A1* | 7/2023 | Pelissier | G06F 21/75 |
| | | | 726/22 |

OTHER PUBLICATIONS

Takuji et al., "Si-Backside Protection Circuits Against Physical Security Attacks on Flip-Chip Devices," IEEE Journal of Solid-State Circuits, vol. 55, No. 10, pp. 1-9, Oct. 2020.
Nemiroff et al., "Fault-Injection Countermeasures, Deployed at Scale," White Paper, Intel Corporation, pp. 1-6, Aug. 2022.

* cited by examiner

100 program at manufacturing

200

ASSEMBLY TEST

DETECTION OF SECURITY ATTACKS THROUGH DIE-ATTACH PAD

FIELD OF THE INVENTION

The present invention relates to security of integrated circuits, and particularly to methods and apparatuses to detect security attacks through the backend of an integrated circuit.

BACKGROUND OF THE INVENTION

To gain access to stored secrets, attackers of integrated circuits (ICs) in various leadframe packages sometimes attempt to physically access the IC from the backside.

Various techniques for securing ICs against backside attacks are known in the art. For example, "Si-Backside Protection Circuits Against Physical Security Attacks on Flip-Chip Devices", Takuji et. al., IEEE JOURNAL OF SOLID-STATE CIRCUITS, VOL. 55, NO. 10, October 2020, presents a cryptographic key protection technique from physical security attacks through Si-backside of IC chip. The article proposes a backside buried metal (BBM) structure forming a meander wire pattern on the Si-backside detects unexpected disconnection of the meander and warns the malicious attempts to expose a vulnerable Si substrate. Moreover, the BBM meander also shields key information of cryptographic circuitry from both passive side-channel attacks and active laser fault injection.

U.S. Pat. No. 9,965,652 discloses security devices for protecting ICs from backside security attacks, including an N− well formed in a substrate, a P+ center disposed in the central region of the N− well, and a P+ ring surrounding the N− well. To prevent latch-up, a pair of inner and outer N+ rings is formed in the N− well. When a current source is applied to the P+ center, the current flows through a portion of the substrate and is picked up by the P+ ring. When an attacker mills the substrate or makes a trench in the substrate, the resistance of the substrate changes. By monitoring the voltage difference between the P+ center and P+ ring, the attempt to attack the die can be detected.

Lastly, In an Intel White Paper titled "Fault-Injection Countermeasures, Deployed at Scale" (Intel reference 0822/DCC/MZ/PDF), by Nemiroff and Tokunaga (August 2022), the authors detail a design, calibration, and validation methodology for a fault injection detection circuit, and describe how fault-injection attacks can impact circuit timing, the high-level design of the Tunable Replica Circuit (TRC), data gathering phase that occurs in HVM (high volume manufacturing), the methodology to create a calibration recipe, false positive testing, fault-injection testing and the final HVM production calibration flow.

SUMMARY OF THE INVENTION

An embodiment of the present invention that is described herein provides an electronic device including an Integrated Circuit (IC) and a package including a die-attach pad for connecting the IC. The IC includes (i) a measurement circuit configured to measure an electrical characteristic of the die-attach pad, and (ii) a security control circuit configured to initiate a responsive action responsively to detecting a deviation of the measured electrical characteristic of the die-attach pad from an initial measurement of the electrical characteristic.

In Some embodiments, the electrical characteristic of the die-attach pad includes a resistance between at least two wires that are bonded to the die-attach pad. In other embodiments, the electrical characteristic of the die-attach pad includes a capacitance between the die-attach pad and an electrical junction in the IC. In an example embodiment the electrical junction includes a metal deposition layer.

In a disclosed embodiment, the IC further includes a non-volatile memory (NVM), configured to store the initial measurement of the electrical characteristic of the die-attach pad. The NVM may be programmed with the initial measurement during manufacturing of the electronic device.

In an embodiment, the electronic device further includes a glue or a film for connecting the IC to the die-attach pad.

There is additionally provided, in accordance with an embodiment that is described herein, a method for securing an electronic device that includes an Integrated Circuit (IC) and a package including a die-attach pad for connecting the IC. The method includes measuring an electrical characteristic of the die-attach pad. A responsive action is initiated responsively to detecting a deviation of the measured electrical characteristic of the die-attach pad from an initial measurement of the electrical characteristic.

The present invention will be more fully understood from the following detailed description of the embodiments thereof, taken together with the drawings in which:

DETAILED DESCRIPTION OF EMBODIMENTS

Overview

Figure 1:
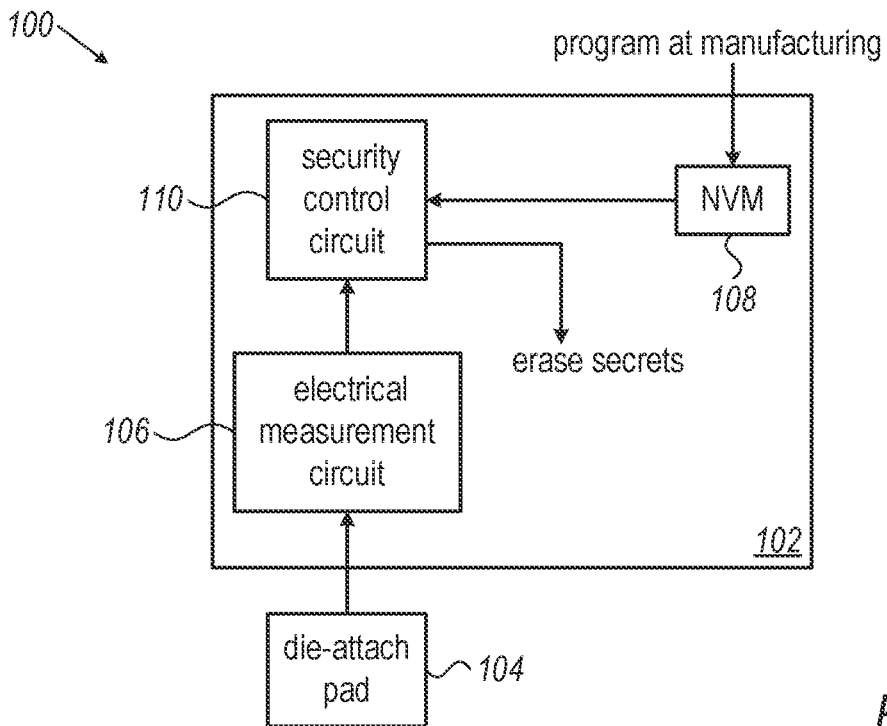
FIG. 1 is a block diagram that schematically illustrates an electronic device with die-attach pad tamper protection, in accordance with an embodiment of the present invention.

Security attacks on electronic devices are sometimes done through a die-attach pad that is connected to an IC that stores secret data.

We will refer hereinbelow to ICs that store secrets as security ICs. The secrets, such as encryption and authentication keys, are typically stored in memory, e.g., in a Non-Volatile Memory (NVM).

Security ICS may be attacked in a variety of techniques, such as fault injection methods, failure analysis and Focused Ion Beam (FIB) edits (and others). Most of those techniques are more easily done from the back-side of the IC; for example, Laser fault injection in advanced semiconductor processes is best done from the die back side, through the transparent substrate, rather than from the front side, through the opaque metal layers; FIB, too, is more easily done from the backside—in modern ICs there could be anywhere from six to ten (and sometimes even more) metal layers, making it hard to access the devices from the top-side, whereas, from the backside, as all signals start and end with metal-1 (the bottom metal layer), FIB is relatively easy.

Inexpensive lead-frame packages such as QFP, QFN and TSSOP are often used for security ICs. In those packages the die is glued on a central metal plate (called "die-attach pad") and pads are bonded to surrounding pins.

In such packages, it is relatively easy to gain access from the package bottom to the die back side without damaging the chip, e.g., by drilling a hole in the bottom of the package, through the die-attach pad (and the glue), exposing the bottom of the die to attacks. In comparison, drilling a hole in a Ball Grid Array (BGA) package is not a feasible mode of attack, as it most likely damages the package and disconnects some of the pins.

Embodiments of the present invention that are disclosed herein provide for apparatuses and methods to detect attacks through the die-attach pad. In some embodiments, electrical characteristics of the die-attach pad are measured during IC production and stored in a non-volatile memory (NVM) thereon (referred to as reference electrical characteristics values). In an embodiment, the electrical characteristics comprise a resistance through the die-attach pad, and in another embodiment the electrical characteristics comprise a capacitance between the die-attach pad and a metal deposition in the IC.

In embodiments, the IC comprises a measurement circuit that measures the electrical characteristics of the die-attach pad, and a security control circuit (SCC) that compares the measured electrical characteristics to the reference value and, according to a deviation measure, may take protective actions (e.g., erase stored secrets). In an embodiment, the measurement takes place once, when the IC is turned on, protecting against die-attach tampering that was done when the IC was powered-off; in other embodiments, the SCC continuously measures the electrical characteristics, to provide protection again die-attach tampering done when the IC is powered on or off.

The embodiments disclosed herein provide relatively inexpensive protection, as no additional IC fabrication steps are added. Moreover, since the die-attach pad, which is the target of the attack is directly examined, a more reliable attack protection may be achieved (when compared to indirect protection, relying on indirect effects).

System Description

In some embodiments, electronic devices comprise an IC that is connected to the IC package through a Die-Attach Pad. Such electronic devices may be prone to attacks ("hacking") through the die-attach pad. For example, an attacker may drill or otherwise puncture the die-attach pad, to gain access to the IC and read secret information that may be stored therein.

FIG. 1 is a block diagram that schematically illustrates an electronic device 100 with die-attach pad tamper protection, in accordance with an embodiment of the present invention. Electronic Device 100 comprises an integrated circuit (IC) 102 that is connected to a package (not shown) through a Die-Attach Pad 104. The IC is typically connected to the die-attach pad 104 using a suitable glue or film.

Any tampering with the die-attach pad, including puncturing using a laser beam, an electron-beam, a mechanical drill, or others is bound to change some electrical characteristics of the die-attach pad (examples that will be described below include change in resistance and/or capacitance).

IC 102 comprises an Electrical Characteristic Measurement circuit 106, configured to measure the electrical characteristics of the die-attach pad, and a Non-Volatile Memory (NVM) 108, configured to store a reference value of the electrical characteristics. In some embodiments, the NVM is programmed during the manufacturing process of the electronic device, as part of a final test and/or calibration process; in embodiments, during manufacturing, electrical measurement circuit 102 measures the electrical characteristics, and a testing equipment writes the measured value (referred to as "reference value") in the NVM. In other embodiments, the reference electrical characteristics value may be measured by a test equipment.

IC 102 further comprises a Security Control Circuit (SCC) 110 that is configured to find a deviation of the electrical characteristics measured by the electrical measurement circuit and the reference value stored in the NVM; if the deviation is greater than a predefined threshold, the SCC is configured to protect sensitive data in the IC, for example, by erasing all stored secrets. In some embodiments, the SCC is operative during device startup, and protects against die-attach drilling that is done while the electronic device is not powered. In other embodiments, the SCC is continually operative (when powered), providing protection also against in-vivo attacks.

As will be shown below (with reference to FIGS. 2 and 3), in some embodiments the measurement of the electrical characteristics utilizes a clock in IC 102. In embodiments, since an attacker can typically stop the clock, the deviation when the clock is stopped will be above the predefined threshold, and the protection mechanism will not be compromised.

In an embodiment, a user may, during Printed Circuit-Board (PCB) manufacturing, solder the die-attach pad directly on the PCB, modifying the die-attach pad electrical characteristics (e.g., lowering the resistance by providing a parallel path). In this case, the reference value stored in the NVM should be updated as part of the PCB manufacturing process.

Thus, in embodiments, secret data stored in the IC are protected against physical attacks through the die-attach pad, that change the electrical characteristics of the die-attach pad beyond a preset threshold.

Figure 2:
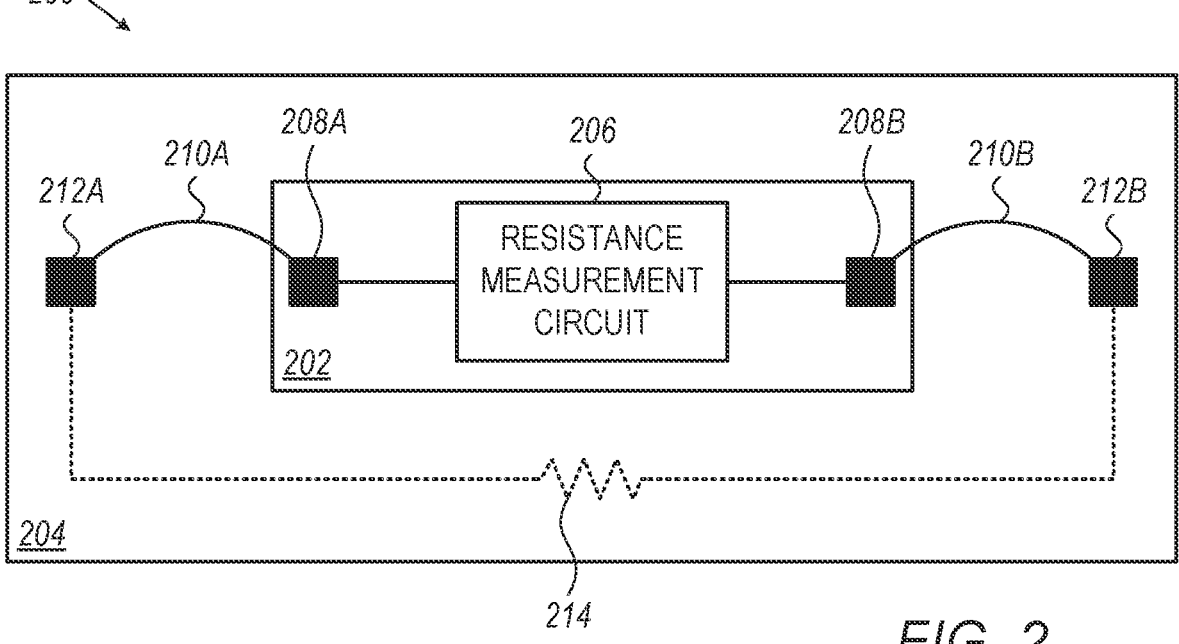
FIG. 2 is a block diagram that schematically illustrates an electronic device with resistance-based tampering detection circuitry, in accordance with an embodiment that is disclosed herein.

FIG. 2 is a block diagram that schematically illustrates an electronic device 200 with resistance-based tampering detection circuitry, in accordance with an embodiment that is disclosed herein. An IC 202 is connected to a die-attach pad 204. IC 202 comprises a Resistance-Measurement Circuit 206. In an example embodiment, the Resistance-Measurement Circuit comprises a current source that sources current through the measured resistance, and an analog to digital converter that converts the voltage on the resistance to digital representation.

Resistance-Measurement Circuit 206 is connected through a Pad 208A and a wire 210A to a first location 212A on the die-attach pad, and, through a pad 208B and a wire 210B to a second location 212B on the die-attach pad. The resistance measurement circuit, thus, measures a resistance 214 through the die-attach pad. In embodiments, locations 212A and 212B on the die-attach pad are remote from each other, typically on two opposite corners or at the centers of two opposite sides of the die-attach pad.

It should be noted that, since the tamper-detection criterion is a deviation between two measurements, the resistance measurement circuit does not have to be either linear or precise, as long as the readouts are consistent.

In some embodiments, since the resistance of wires 210A and 210B is typically larger than the resistance 214 of the die-attach pad, multiple parallel wires are used to connect the measurement circuit to the die-attach pad. In other embodiments, a die-attach pad with higher sheet-resistance is used, e.g., using different material with lower conductivity, or using a thinner profile.

Figure 3:
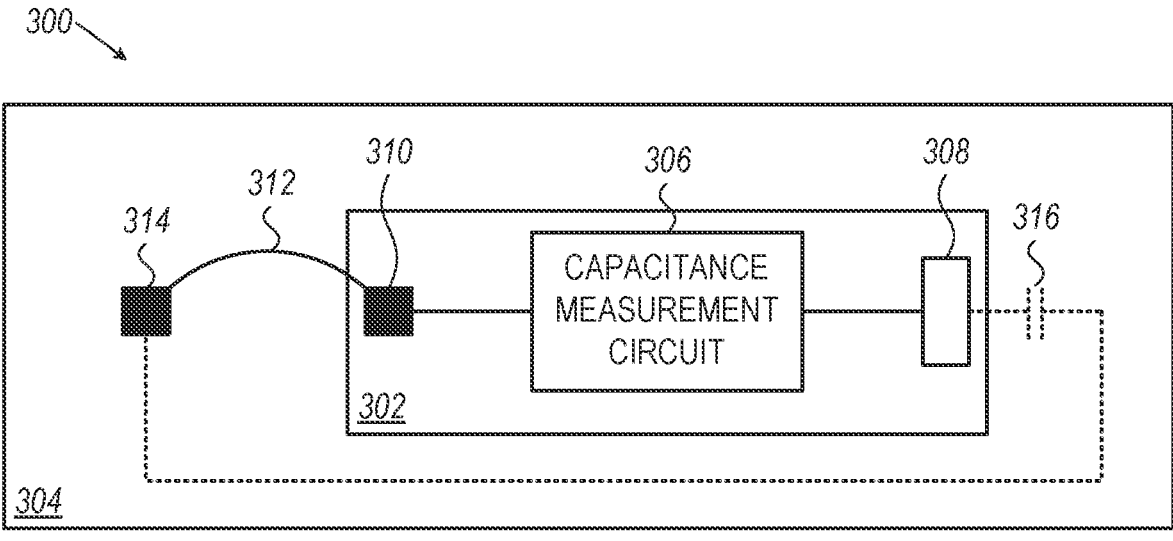
FIG. 3 is a block diagram that schematically illustrates an electronic device with capacitance-based tampering detection circuitry, in accordance with an embodiment that is disclosed herein.

FIG. 3 is a block diagram that schematically illustrates an electronic device 300 with capacitance-based tampering detection circuitry, in accordance with an embodiment that is disclosed herein. An IC 302 is connected (e.g. to a galvanically floating die-attach pad 304. IC 302 comprises a Capacitance-Measurement Circuit 306 that is connected to a floating node 308 (typically an electrically isolated metal deposition area) and, through a bond 310 and a wire 312, to a bond 314 on the die-attach pad 304. The capacitance measurement circuit is configured to measure the capacitance between the floating node and the die-attach pad.

Since the tamper-detection criterion is a deviation between two measurements, the capacitance measurement should be consistent and sensitive, but does not have to be either linear or precise. In some embodiments, capacitance measurement circuit 306 comprises a current source that charges (or discharges) the capacitance; in other embodiments, a simpler (albeit less accurate) circuit that charges (or discharges) the capacitance through a voltage source in series with a resistance is employed. In some embodiment, the voltage on the capacitance is measured after a preset time (derived, for example, from an on-chip clock). In yet other embodiments, the capacitance measurement circuit measures a time (e.g., counts clock cycles) until the voltage on the capacitance reaches a preset level.

In embodiments, since the variance between the capacitances of the metal layers to the die-attach pad is small, floating node 308 may comprise any metal layer.

Alternatively, in an embodiment, the Redistribution Layer (RDL), covering most of the area above the chip (excluding metal pads and power routing), which is used as a top-side shield against FIB/laser attacks, can also be used as the capacitance top plate. The distance between the RDL and the die-attach pad, or the die thickness, typically comprises 7 mil of silicon and 0.5 mil of epoxy; in embodiments, die thickness is trimmed down to 5 mil of silicon and 0.5 mil of epoxy, and, in yet other embodiments, to 3 mil+film (film is used as an alternative to liquid glue). At a gap size of 3.5 mil, the capacitances of a 1 mm² capacitor and 1 cm² capacitors are, respectively, 0.1 pF and 10 pF.

Figure 4:
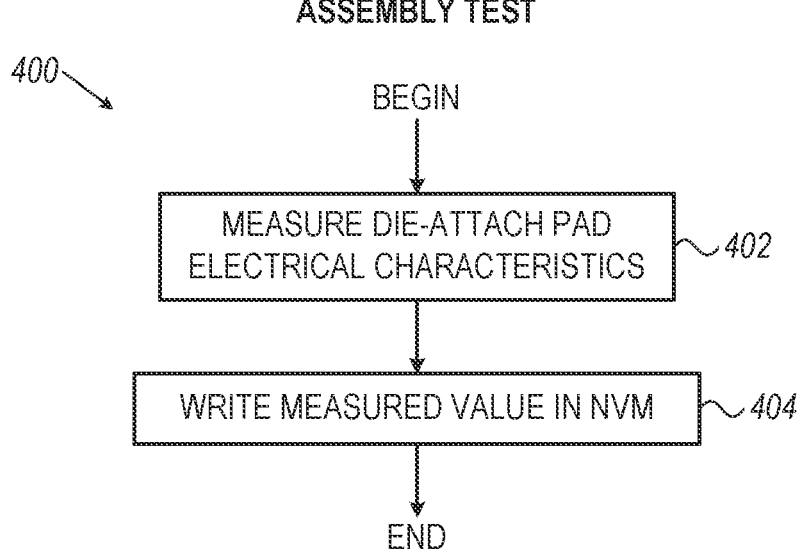
FIG. 4 is a flowchart that schematically illustrates a method for registering the electrical characteristics of the die-attach pad of an electronic device during manufacturing, in accordance with an embodiment that is disclosed herein.

The configurations of electronic device 200 and 300 illustrated in FIGS. 3 and 4 are examples that are cited merely for the sake of conceptual clarity. Other configurations may be used in alternative embodiments. In some embodiments, for example, the die-attach pad is connected to ground (in the IC and/or in the board), and can be used as the negative node of the capacitance measurement, while a floating metal plate implemented inside the IC is used as the positive node. In other embodiments both the resistance and the capacitance are measured. In an embodiment, the capacitance between the die-attach pad and the ground is measured (and, hence, floating node 308 is not needed).

FIG. 4 is a flowchart 400 that schematically illustrates a method for registering the electrical characteristics of the die-attach pad of an electronic device during manufacturing, in accordance with an embodiment that is disclosed herein. The method is executed by a test-equipment that is used during the final test of the electronic device.

The flowchart starts at a Measure-Electrical-Characteristics operation 402, wherein the test equipment measures the electrical characteristics of the die-attach pad (e.g., resistance, or capacitance). In some embodiments, the test equipment directly measures the characteristics; in other embodiments, the test equipment activates the characteristics measurement circuit in the device (e.g., electrical characteristics measurement circuit 106, FIG. 1).

Next, in a Write Measurement Value operation 404, the test equipment writes the measurement results of operation 402 in a non-volatile memory (e.g., NVM 108, FIG. 1) of the electronic device. After operation 404 the flowchart ends.

Figure 5:
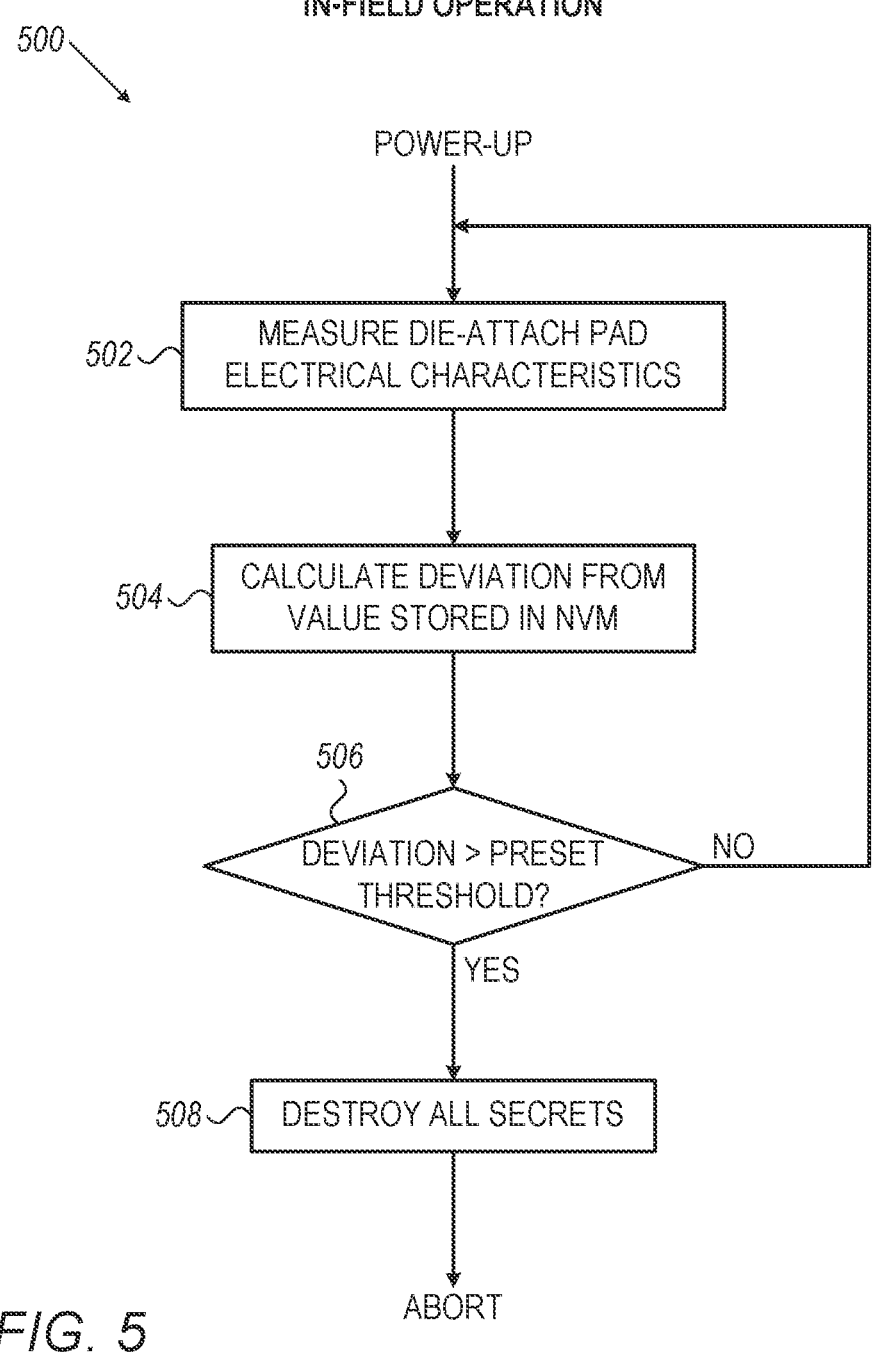
FIG. 5 is a flowchart 500 that schematically illustrates a method for on-line protection of an electronic device against die-attach tampering, in accordance with an embodiment that is disclosed herein.

FIG. 5 is a flowchart 500 that schematically illustrates a method for on-line protection of an electronic device against die-attach tampering, in accordance with an embodiment that is disclosed herein. The method is executed by SCC 110 and Electrical Characteristics Measurement Circuit 106 (FIG. 1).

The flowchart is initiated at power-up and continues as long as power is applied to the electronic device. The flowchart starts at a Measure-Electrical-Characteristics operation 502, wherein the Electrical Characteristics Measurement Circuit 106 measures the electrical characteristics of the die-attach pad (e.g., resistance, or capacitance). Next, in a Calculate-Deviation operation 504, the SCC compares the measured value to the reference value (stored, for example, in NVM 108, FIG. 1); in some embodiments the deviation is the absolute value of the difference between the measured and the reference values; in other embodiment, a relative deviation measure is used, e.g., the absolute difference divided by the reference value.

The SCC then, at a Compare Deviation operation 506, compared the deviation to a preset threshold. If the deviation is not greater than the threshold, the flowchart will reenter operation 502, to reexamine the electrical characteristics (and, thus, provide continuous protection). If, in operation 506, the deviation is larger than the threshold, the flowchart will enter a Destroy-Secrets operation 508, wherein the SCC destroys some or all the stored secrets (alternatively, or additionally the SCC) may, in some embodiments, permanently disable access to the stored secrets). After operation 508 the IC operation will abort.

The configurations of flowcharts 400, 500 illustrated in FIGS. 3, 4 and described above are example configurations. Other configurations may be used in alternative embodiments. For example, in some embodiments, the SCC executes flowchart 500 only once, right after power-up and, in operation 506, if the deviation is not larger than the threshold, the SCC exits (this approach saves power consumption, but provides protection against off-power tampering of the die-attach pad only).

In some embodiments, a package that does not require a die-attach pad is used (e.g., a BGA package); instead, the package is modified to include a metal plate that covers most, or all, of the IC substrate area; the metal plate is used for attack detection, similarly to the use of the die-attach pad described above.

The configurations of electronic devices 100, 200 and 300, including resistance measurement circuit 206 and capacitance measurement circuit 306, and the methods of flowcharts 400 and 500, illustrated in FIGS. 1 through 5 and described hereinabove are example configurations and methods that are shown purely for the sake of conceptual clarity. Any other suitable system configurations and methods can be used in alternative embodiments. The different elements of electronic circuit 100, may be implemented in an integrated circuit, such as an application specific integrated circuit (ASIC) or a field-programmable gate-array (FPGA).

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. An electronic device, comprising:
an Integrated Circuit (IC);
a package; and
a die-attach pad that connects the IC to the package,
wherein the IC comprises:
a measurement circuit, configured to measure a capacitance between the die-attach pad and a metal deposition layer in the IC; and
a security control circuit, configured to initiate a responsive action responsively to detecting a deviation of the measured capacitance from an initial measurement of the capacitance.

2. An electronic device, comprising:
an Integrated Circuit (IC);
a package; and
a die-attach pad that connects the IC to the package,

8 wherein the IC comprises:
a measurement circuit, configured to measure a resistance between at least two wires that are bonded to the die-attach pad; and
a security control circuit, configured to initiate a responsive action responsively to detecting a deviation of the measured resistance from an initial measurement of the resistance.

3. The electronic device according to claim 1, wherein the IC further comprises a non-volatile memory (NVM), configured to store the initial measurement of the capacitance.

4. The electronic device according to claim 3, wherein the NVM is programmed with the initial measurement during manufacturing of the electronic device.

5. The electronic device according to claim 1, further comprising a glue or a film for connecting the IC to the die-attach pad.

6. A method for securing an electronic device that includes an Integrated Circuit (IC) and a package comprising a die-attach pad that connects the IC to the package, the method comprising:
measuring a capacitance between the die-attach pad and a metal deposition layer in the IC; and
initiating a responsive action responsively to detecting a deviation of the measured capacitance from an initial measurement of the capacitance.

7. The method according to claim 6, further comprising storing the initial measurement of the capacitance in a non-volatile memory (NVM) in the IC.

8. The method according to claim 7, wherein storing the initial measurement comprises programming the NVM with the initial measurement during manufacturing of the electronic device.

9. The method according to claim 6, further comprising a glue or a film for connecting the IC to the die-attach pad.

* * * * *